(12) United States Patent
Sewall (10) Patent No.: US 7,764,784 B2
(45) Date of Patent: Jul. 27, 2010

(54) HANDSET CRADLE

(75) Inventor: Patrick M. Sewall, Boise, ID (US)

(73) Assignee: Cradlepoint, Inc., Boise, ID (US)

( * ) Notice: Subject to any disclaimer, the term of this patent is extended or adjusted under 35 U.S.C. 154(b) by 477 days.

(21) Appl. No.: 10/936,124

(22) Filed: Sep. 8, 2004

(65) Prior Publication Data

US 2006/0050866 A1 Mar. 9, 2006

(51) Int. Cl.
*H04M 9/00* (2006.01)
*H04M 1/00* (2006.01)

(52) U.S. Cl. .............................. 379/428.02; 455/575.1

(58) Field of Classification Search ............ 379/428.02, 379/454–455, 441, 428.01, 428.04, 420.04, 379/426; 455/569.1, 563, 575.1, 452.2
See application file for complete search history.

(56) References Cited

U.S. PATENT DOCUMENTS

| | | | |
|---|---|---|---|
| 5,594,946 A | | 1/1997 | Menich et al. |
| 5,859,628 A | * | 1/1999 | Ross et al. ................... 345/173 |
| 5,864,539 A | * | 1/1999 | Yin ........................... 370/236 |
| 6,028,848 A | | 2/2000 | Bhatia et al. |
| 6,377,825 B1 | * | 4/2002 | Kennedy et al. ......... 455/569.2 |
| 6,434,187 B1 | | 8/2002 | Beard et al. |
| 6,535,592 B1 | | 3/2003 | Snelgrove |
| 6,560,442 B1 | * | 5/2003 | Yost et al. ................... 455/423 |
| 6,609,197 B1 | | 8/2003 | Ketcham et al. |
| 6,615,262 B2 | | 9/2003 | Schweitzer et al. |
| 6,735,447 B1 | | 5/2004 | Muller |
| 6,795,700 B2 | | 9/2004 | Karaoguz et al. |
| 7,400,903 B2 | | 7/2008 | Shoemake et al. |
| 7,620,065 B2 | | 11/2009 | Falardeau |
| 2001/0039580 A1 | | 11/2001 | Walker et al. |
| 2001/0046870 A1 | | 11/2001 | Stilp et al. |
| 2002/0025832 A1 | * | 2/2002 | Durian et al. ............... 455/556 |
| 2003/0043755 A1 | | 3/2003 | Mitchel |
| 2003/0046396 A1 | | 3/2003 | Richter et al. |
| 2003/0059005 A1 | * | 3/2003 | Meyerson et al. ........ 379/88.17 |
| 2003/0200308 A1 | | 10/2003 | Tameda et al. |
| 2004/0049576 A1 | | 3/2004 | Schweitzer et al. |
| 2004/0110544 A1 | * | 6/2004 | Oyagi et al. ............. 455/575.1 |
| 2004/0133793 A1 | | 7/2004 | Ginter et al. |

(Continued)

FOREIGN PATENT DOCUMENTS

JP 20010186565 7/2001

(Continued)

OTHER PUBLICATIONS

"Router." Webster's New World Telecom Dictionary. 2009, Your Dictionary. Aug. 28, 2009, <www.yourdictionary.com/telecom/router>.*

(Continued)

*Primary Examiner*—Fan Tsang
*Assistant Examiner*—Phylesha Dabney
(74) *Attorney, Agent, or Firm*—Zarian Midgley & Johnson PLLC (57) ABSTRACT

An embodiment of a handset cradle includes a base component and a handset component configured to couple with the base component. The handset component provides an interface with a particular type of handset selected from a plurality of handset types. This interface enables an exchange of data between the base component and a handset interfacing with the handset component.

22 Claims, 6 Drawing Sheets

U.S. PATENT DOCUMENTS

| | | | |
|---|---|---|---|
| 2004/0139170 A1 | 7/2004 | Shen et al. | |
| 2004/0152449 A1 | 8/2004 | Koshihara | |
| 2004/0153676 A1 | 8/2004 | Krantz et al. | |
| 2004/0205154 A1* | 10/2004 | Dalton et al. | 709/217 |
| 2005/0014525 A1 | 1/2005 | Tsunehara et al. | |
| 2005/0101340 A1 | 5/2005 | Archiable | |
| 2005/0108573 A1 | 5/2005 | Bennett et al. | |
| 2005/0221850 A1 | 10/2005 | Kashiwase | |
| 2005/0233728 A1 | 10/2005 | Karaoguz et al. | |
| 2005/0245233 A1 | 11/2005 | Anderson | |
| 2005/0246434 A1 | 11/2005 | Bantz et al. | |
| 2005/0259645 A1 | 11/2005 | Chen et al. | |
| 2005/0262248 A1 | 11/2005 | Jennings, III et al. | |
| 2006/0072474 A1 | 4/2006 | Mitchell | |
| 2006/0077607 A1 | 4/2006 | Henricks et al. | |
| 2006/0184670 A1 | 8/2006 | Beeson et al. | |
| 2006/0187890 A1 | 8/2006 | Lin | |
| 2007/0002846 A1 | 1/2007 | Rada et al. | |
| 2008/0005108 A1 | 1/2008 | Ozzie et al. | |
| 2008/0049630 A1 | 2/2008 | Kozisek et al. | |
| 2008/0159167 A1 | 7/2008 | Ito et al. | |
| 2009/0129319 A1 | 5/2009 | Buddhikot et al. | |
| 2009/0138447 A1 | 5/2009 | Kalavade | |

FOREIGN PATENT DOCUMENTS

| | | |
|---|---|---|
| KR | 20040028099 | 4/2004 |

OTHER PUBLICATIONS

USPTO, "Final Office Action in U.S. Appl. No. 11/673,965.", Apr. 1, 2010.
USPTO, "Office Action in U.S. Appl. No. 11/673,965.", Sep. 2, 2009.
USPTO, "Advisory Action in U.S. Appl. No. 11/376,973", Mar. 19, 2010.
R. Elz, R. Bush, "RFC 2181 Clarifications to the DNS Specification, Internet Engineering Task Force, http://tools.ietf.org/html/rfc2181, 1 page", Jul. 1997.
P. Vixie, S. Thomson, Y. Rekhter, J. Bound, "RFC 2136 Dynamic Updates in the Domain Name System (DNS Update), Internet Engineering Task Force, 51 pages.", Apr. 1997.
USPTO, "Final Office Action in U.S. Appl. No. 11/673,973.", Dec. 10, 2009.
USPTO, "Office Action in U.S. Appl. No. 11/673,973.", May 28, 2009.
Wikipedia, "Proxy Server, http://en.wikipedia.org/wiki/Proxy_server ; 9 pages,", Apr. 12, 2010.
USPTO, "Final Office Action in U.S. Appl. No. 11/673,956.", Apr. 15, 2010.
USPTO, "Office Action in U.S. Appl. No. 11/673,956.", Sep. 2, 2009.
USPTO, "Office Action in U.S. Appl. No. 12/172,885.", Apr. 26, 2010.
USPTO, "Office Action in U.S. Appl. No. 12/350,407.", Apr. 5, 2010.
PCT, "International Search Report & Written Opinion of the International Searching Authority for Application No. PCT/US2007/062077,", Nov. 20, 2007.
PCT, "International Search Report & Written Opinion of the International Searching Authority for Application No. PCT/US2007/062078,", Mar. 5, 2008.
PCT, "International Search Report & Written Opinion of the International Searching Authority for Application No. PCT/US2007/062079,", Nov. 8, 2007.
PCT, "International Search Report and Written Opinion of the International Searching Authority for Application No. PCT/US2008/076836,", Mar. 6, 2009.
PCT, "International Search Report & Written Opinion of the International Searching Authority for Application No. PCT/US2008/083409,", May 12, 2009.

* cited by examiner

HANDSET CRADLE

BACKGROUND

Current technology allows a handset such as cellular telephone to interact with a laptop or other computing device. This typically requires physically connecting the handset to the computing device as well as installing and configuring specialized software. Such interactions can allow a computing device to utilize a handset to access the Internet.

Different handset types can have different physical interface requirement for connecting to a computing device. Those handset types that do share the same physical interface requirements can often require different communication protocols for controlling the handset. The disparate physical interfaces and communication protocols make it difficult for a third party manufacturer to efficiently provide a product enabling the interaction between a computing device and the various types of available handsets.

DETAILED DESCRIPTION OF THE INVENTION

Introduction

Current technology allows a handset such as cellular telephone to interact with a laptop or other computing device. For example, a handset such as a cellular telephone can be used to connect a computing device to the Internet. Various embodiments described below utilize a handset cradle that provides an interface between one or more computing devices and handsets of various types.

As is described below, the handset cradle is modular incorporating a base component and a handset component. The base component provides the common functionality regardless of the type of handset. Different handset components are specialized to the physical interface and communication protocol requirements of different types of handsets. In short a handset component for a particular handset type provides an interface between a handset of that type and the base component. To provide a handset cradle for a given handset type, a handset component designed for that handset type is selected and coupled to a base component. To provide a handset cradle for another handset type, a handset component designed for that other handset type is selected and coupled to a base component.

Environment

Figure 1:
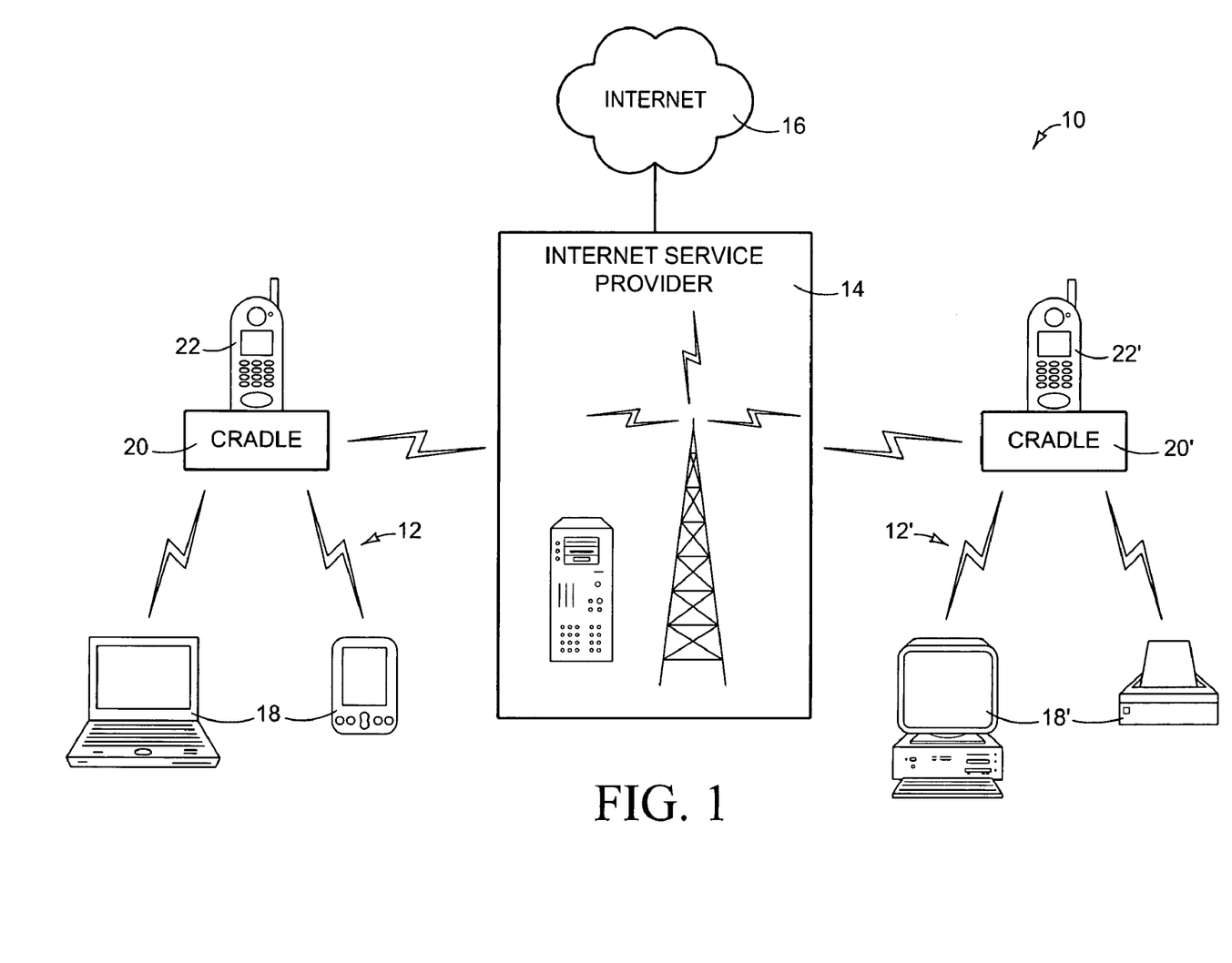
FIG. 1 illustrates an exemplary environment in which embodiments of the present invention can be implemented.

FIG. 1 illustrates exemplary environment 10 in which various embodiments of the present invention may be implemented. Environment 10 includes local network 12 and 12', Internet service provider 14 and Internet 16. Local network 12 includes network devices 18 handset cradle 20, and handset 22. Similarly, local network 12' includes network devices 18', handset cradle 20', and handset 22'. Network devices 18 and 18' represent generally any devices capable of network communications. Examples include printers and computing devices such as laptop and desktop computer as well as PDAs (Personal Digital Assistants).

Handsets 22 and 22' represent generally any handheld electronic device. As shown handsets 22 and 22' are cellular telephones capable of providing a connection to an external network—in this case—Internet service provider 14 and Internet 16. Alternatively, for example, handsets 22 and 22' could be cellular enabled PDAs. Handset cradles 20 and 20', described in more detail below, are responsible for providing an interface between computing devices 18 and 18' and handsets 22 and 22' respectively. Handset cradles 20 and 20' allow, for example local networks 12 and 12' to access Internet 16 via handsets 22 and 22'.

Cradle

Figure 2A:
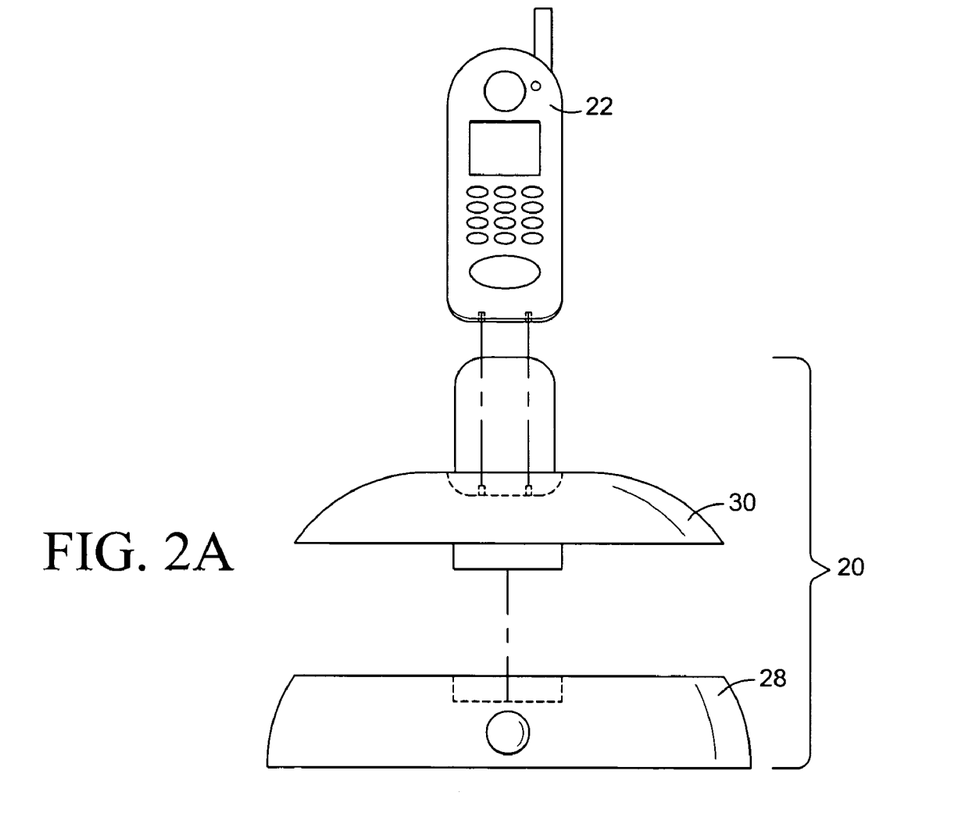
FIGS. 2A and 2B schematically illustrate a handset cradle according to an embodiment of the present invention.
Figure 2B:
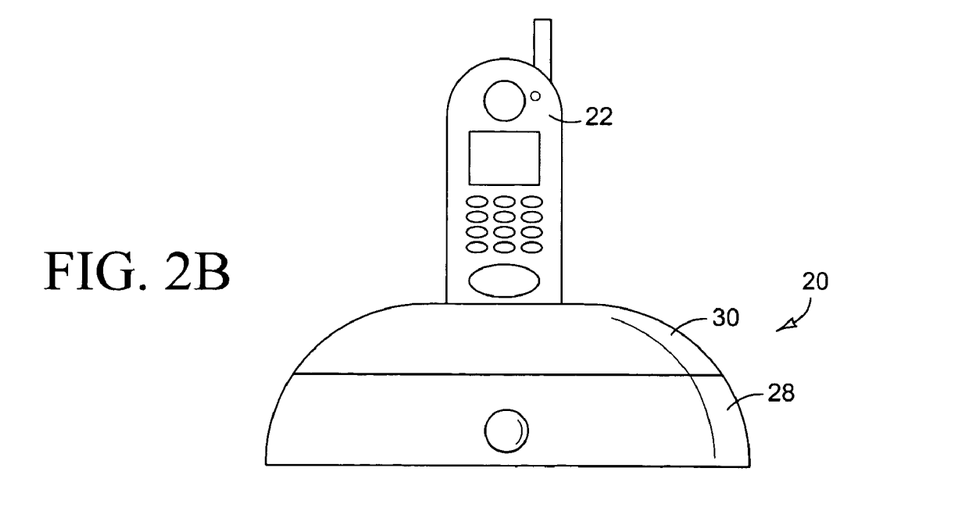

FIGS. 2A and 2B illustrate the modular construction of an exemplary handset cradle 20. Handset cradle 20 includes base component 28 and handset component 30. As is shown, handset component 30 couples to base component 28 and is specifically configured to interface with handset 22. In this manner, handset component 30 allows base component 28 and handset 22 to interact. A different handset component (not shown) specifically configured to interface with a different type of handset (not shown) could instead be coupled to base component 28. This would allow base component 28 and that different type of handset to interact.

Figure 3:
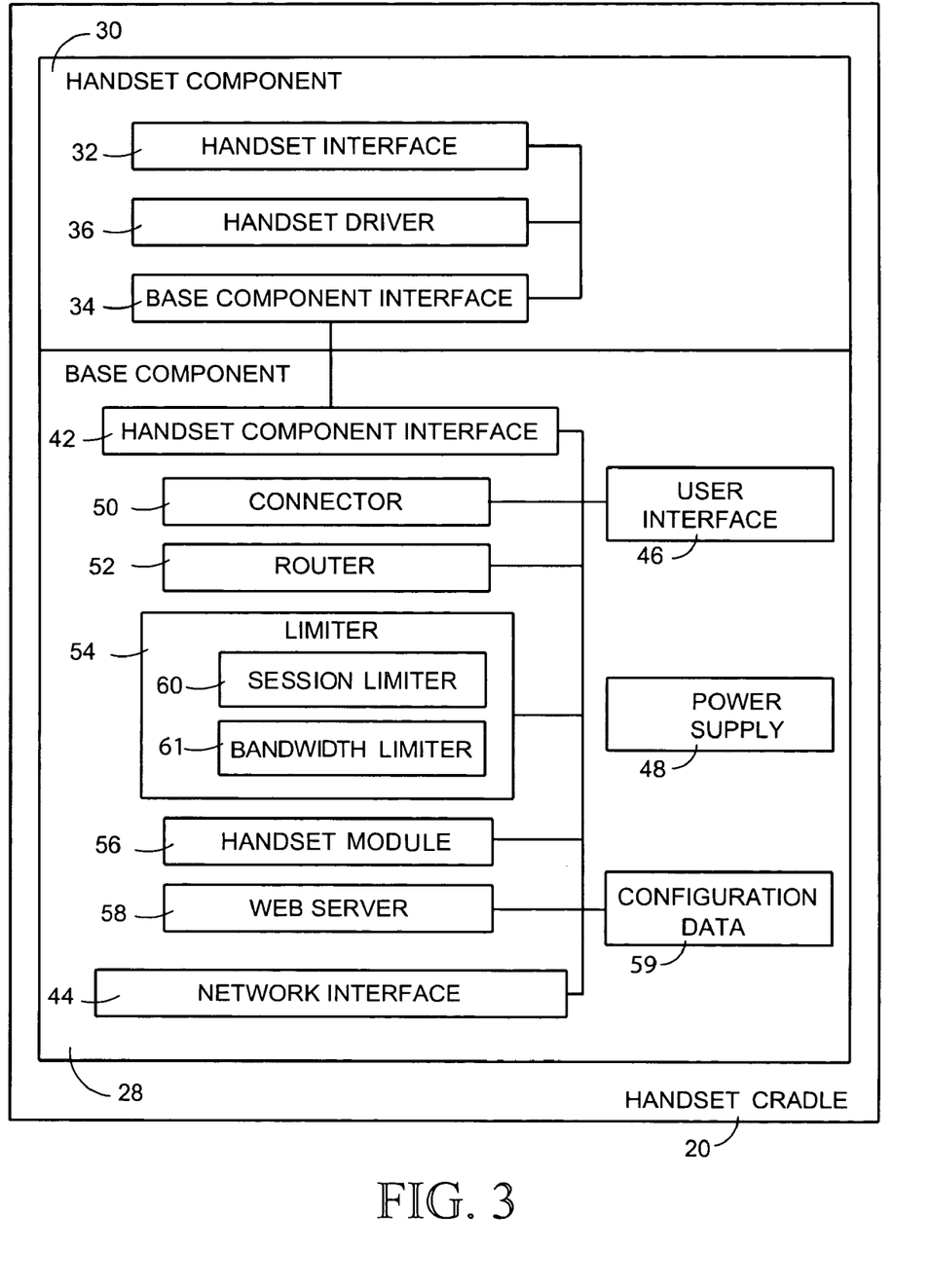
FIG. 3 is a block diagram showing physical and logical components of a handset cradle according to an embodiment of the present invention.

FIG. 3 is a block diagram illustrating physical and logical components of handset cradle 20. As described above, handset cradle 20 includes base component 28 and handset component 30. Handset component 30 includes handset interface 32, base component interface 34, and handset driver 36. Handset interface 32 represents an interface through which a signal can be sent to a particular type of handset selected from a variety of handset types. For example, handset interface 32 could be a physical interface shaped to support the particular handset while mating with that handset's physical connector—a male or female multi-pin connector for example. In this manner signals for controlling the operation of the particular type of handset can be sent through handset interface 32 and accepted by the handset via its own physical connector. In addition to controlling the functional aspects of the handset, a given signal may also include an electrical current for powering the handset or recharging the handset's battery.

Base component interface 34 represents generally any interface capable of being utilized to couple handset component 30 to base component 28. For example, base component interface 34 may be a male or female multi-pin connector configured to mate with a matching connector supplied by base component 28. Handset driver 36 represents generally any combination of hardware and/or program instructions capable of translating signals received through base component interface 34 into a format compatible with a specific type of handset selected from a variety of handset types—the particular type of handset being the same type of handset with which handset interface 32 is compatible. Handset driver 36 then can utilize handset interface 32 to send translated signals to a handset interfacing with handset component 30. Handset driver 36 is also responsible for translating signals received from a handset into a format compatible with based component 28.

In the example shown, base component 28 includes handset component interface 42, network interface 44, user interface 46, and power supply 48. Handset component interface 42 represents generally any interface capable of being utilized to couple base component 28 to handset component 30. For example, handset component interface 42 may be a male or female multi-pin connector configured to mate with a matching base component interface 34.

Network interface 44 represent generally any hardware and/or program instructions capable of supplying an interface between based component 28 and one or more network devices (not shown). For example, network interface 28 may include a transceiver operable to exchange network communications utilizing a wireless protocol such as ultrawideband (UWB), Bluetooth, or 802.11. Alternatively, network interface 44 may be a hub providing RJ45 (Registered Jack) connectors for connecting to one or more network devices.

User interface 46 represents generally any hardware and/or program instructions enabling a user to interact directly with base component 28. For example, user interface 46 may include one or more buttons that when pressed send a corresponding signal. Power supply 48 represents generally any hardware capable of supplying power to a handset interfacing with handset component 30.

Base component 28 is also shown to include connector 50, router 52, and limiter 54. Connector 50 represents hardware and/or program instructions for sending a signal to handset component 30 for a handset interfacing with handset component 30 to connect with an external network to which the handset can transmit outbound network communications. For example, where a handset is a cellular phone, connector 50 may send a signal to that when translated by handset component 30 causes a handset to dial a particular number through which an external network can be accessed.

Router 52 represents hardware and/or program instructions for routing outbound network communication received through network interface 44 via handset component 30 to be transmitted by a handset to an external network. Router 52 is also responsible for routing inbound network communications received from the external network and directed via network interface 44 to a specified network device. Outbound and inbound network communications, for example can be an IP (internet Protocol) packets directed to a target on an external network or to a particular network device on the local area network.

Limiter 54, discussed in more detail below, represents hardware and/or program instructions capable of limiting inbound and outbound network communications. Where a handset in the form of a cellular telephone is used to establish a connection to an external network, outbound and inbound network communications are transmitted wirelessly and consume bandwidth allotted to a particular cellular service provider. As will be described, limiter 54 functions to help reduce the risk of over-utilizing the limited bandwidth available to all cellular telephones.

In the example of FIG. 3, base component 56 is also shown to include handset module 56, web server 58, and configuration data 59. Handset module 56 represents hardware and/or programming capable of initiating and/or performing an action taken with regard to a handset interfacing with handset component 30. Imagine a handset capable of taking and storing digital images. Handset module 56 might then be configured to interact with that handset via handset component 30 and retrieve one or more digital images and then send those images through network interface 44 to a network device such as a color printer for production. This process may be initiated by a user pressing a button supplied by user interface 46.

Imagine a handset capable of storing personal data such as appointments and electronic mail messages. Handset module 56 might then be configured to interact with that handset via handset component 30 to access the personal data and then to synchronize or initiate the synchronization of that data with personal data stored on a network device. This process may by initiated be a handset module 56 upon detecting the handset being connected to handset component 30.

Web server 58 represents generally any hardware and or program instructions capable of serving an interface such as a web page that when requested and displayed by a network device allows a user to provide or otherwise select configuration settings related to the operation of handset cradle 20. Configuration data 59 represents generally any memory for storing configuration settings so that they can be accessed by connector 50, router 52, limiter 54, and handset module 56 parameter settings.

Configuration settings can include a telephone number to call to establishing a connection with an external network. Configuration settings can include data identifying the maximum number of concurrent outbound network device sessions allowed. Configuration settings can also include data assigning a particular button provided user interface 48 to a particular function of handset module 56. Using the example above a configuration setting may indicate that when a user presses a user interface button, handset module 56 will retrieve a digital image or other file from a handset and send that file to a network device such as a printer.

In the example of FIG. 3, limiter 54 includes session limiter 60 and bandwidth limiter 61. Session limiter 60 represents hardware and/or program instructions for limiting the routing of outbound network communications to those outbound network communications originating from one or more specified network devices. As an example, an outbound network communication sent from a particular network device may be received by base component 28 at a time when a handset interfacing to handset component 30 has not established a connection to an external network. In such a case, the outbound communication is held and connector 50 sends a signal resulting in the handset establishing a connection and the outbound network communication is routed. The outbound network communication will in some manner identify the network device from which it originated. The identification may, for example come in the form of an IP (Internet Protocol) address or MAC (Media Access Control) address. As long as a connection to the external network is maintained, Session limiter 60 will only allow outbound communications identifying that network device to be routed.

The period for which session limiter 60 routs of outbound communications from a particular network device is referred to as an outbound network device session. In the example above, session limiter 60 only allowed one outbound network device session at a time—that session being for the network device whose outbound network communication caused a connection to be established with an external network. In an alternative embodiment, session limiter 60 may allow two or more concurrent outbound network device sessions up to a maximum number. In this case session limiter 60 would prevent the routing of an outbound communication from a particular network device if routing the outbound communication would cause the number of concurrent outbound network device sessions to exceed the maximum number allowed.

For example, data identifying the maximum number allowed may be received from a cellular service provider. This data may be received once a cellular phone handset initializes communication with a cellular service provider even before a connection is made to the external network. The maximum number allowed may be based on a subscription plan corresponding to the cellular phone handset. Handset component 30 would pass that data on to base component 28—specifically session limiter 60. Until the connection to the external network is dropped, limiter 54 could then keep a running count of the number of concurrent outbound network device sessions and prevent that number from exceeding the maximum number allowed.

For example, on a first come first serve basis, session limiter 60 might allow outbound network device sessions to be established for a given number of network devices—that number being the maximum number of concurrent network device sessions allowed. The first outbound network device session would be established for the network device that caused the connection to be made to the external network. Another outbound network device session is established for each additional network device from which an outbound network communication is received. Session limiter 60 allows this to continue until the routing of the next outbound network communication would cause the number of concurrent sessions to exceed the maximum number allowed.

Bandwidth limiter 61 represents hardware and/or program instructions for selectively restricting outbound and inbound network communications based on one or more policies. Based on those policies, the restrictions may selectively limit or even cut off the available bandwidth for certain types or all types of inbound and outbound network communications.

Certain policies may be constant while other policies may be based on observed user behaviors. For example, a constant policy may specify zero bandwidth availability for outbound and inbound network communications transferring specific file types such as ring tones, wallpaper, and larger files such copies of movies and other video files.

As noted above where a handset in the form of a cellular telephone is used to establish a connection to an external network, outbound and inbound network communications are transmitted wirelessly and consume the limited bandwidth allotted to a particular cellular service provider. Users engaging in file sharing, computers infected with viruses, and denial of service attacks all pose risks that the allotted bandwidth will be over-utilized.

To deter file sharing, a constant policy may specify a time duration for which inbound and outbound communications can consume a specified bandwidth. Once that duration expires, the policy may specify a second duration for which bandwidth will be limited. If the second duration is allowed to expire, the available bandwidth may be limited further. This process can repeat until the available bandwidth is clamped down to zero for yet another specified duration. Once this duration expires, bandwidth limits may be removed or stepped back up. A running count may be kept of the number of time the available bandwidth is clamped down to zero. Once that running count reaches a specified number, all outbound and/or inbound communications may be blocked until a reset signal is given by a cellular service provider.

Policies based on observed user behavior may also deter file sharing while helping limit the effects of virus and denial of service attacks. For example, bandwidth limiter 61 may identify that on average, a user sends a specified number of electronic mail messages in a day or other specified duration. When that specified number is exceeded by a threshold amount, bandwidth limiter 61 may block outbound electronic mail messages for the remainder of the duration. This can help to limit the effect of viruses that hijack a network device and use that device to spread by sending copies of itself via electronic mail messages.

Bandwidth limiter 61 may identify on average that a user receives a specified number of electronic mail messages a day or other specified duration. When that specified number is exceeded by a threshold amount, bandwidth limiter 61 may block inbound electronic mail messages for the remainder of the duration. This can help to limit the effect of a denial of service attack.

When transferring larger files such as movies, block sizes for inbound and outbound communications are relatively large. Bandwidth limiter 61 may identify average block sizes for outbound or inbound communications. When, for a specified duration, the block sizes exceed the average by a threshold level, inbound or outbound communication may be blocked or, as described above, clamped down.

Operation

Figure 4:
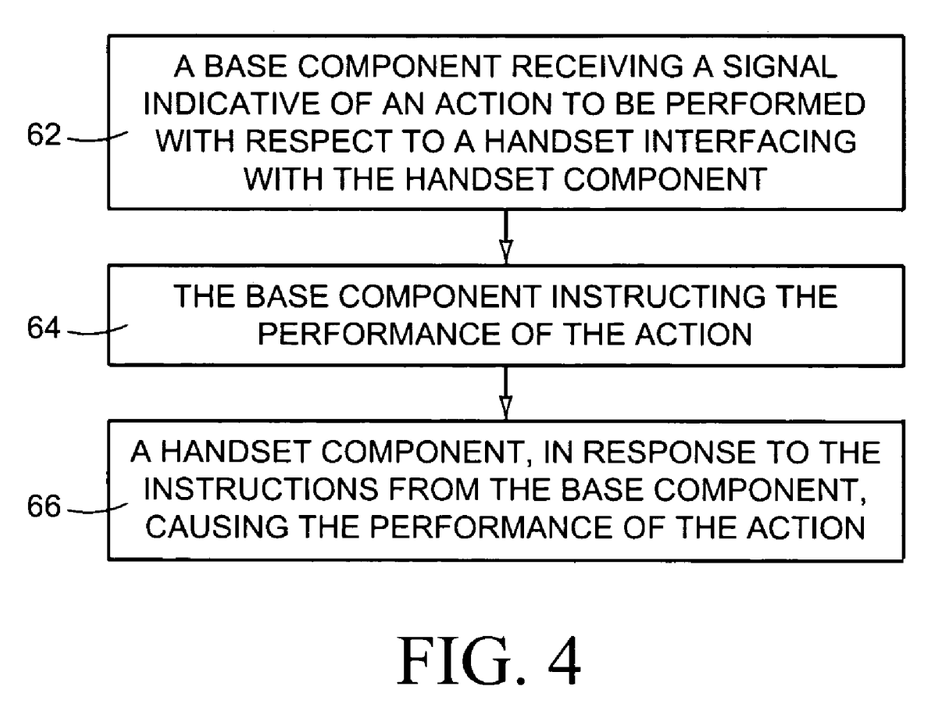
FIGS. 4-6 are exemplary flow diagram illustrating steps taken in performance of various embodiments of the present invention.

The operation of embodiments of the present invention will now be described with reference to FIGS. 4-6. FIG. 4 is an exemplary flow diagram that helps illustrate the interaction between a base component and a handset component of a handset cradle. Initially a base component receives a signal indicative of an action to be performed with respect to a handset interfacing with the handset component (step 62). In the examples above, this signal can come in the form of an outbound network communication received from a network device. The signal can come from a user interacting with a user interface. The signal can also result from the handset being connected with the handset component.

The base component then instructs the performance of the action (step 64). The handset component, in response to the instructions from the base component, causes the performance of the action (step 66). Using the examples again from above, step 64 can involve routing an outbound network communication via the handset component to be transmitted by the handset. Step 66 then involves the handset component forwarding the outbound network communication in the proper format to the handset for transmission. Step 64 can involve sending a signal to the handset component for use in causing the handset to perform a task such as returning a digital image to be produced or personal data to be synchronized. Step 66 then involves the handset component forwarding the signal in the proper format to be acted upon by the handset.

Figure 5:
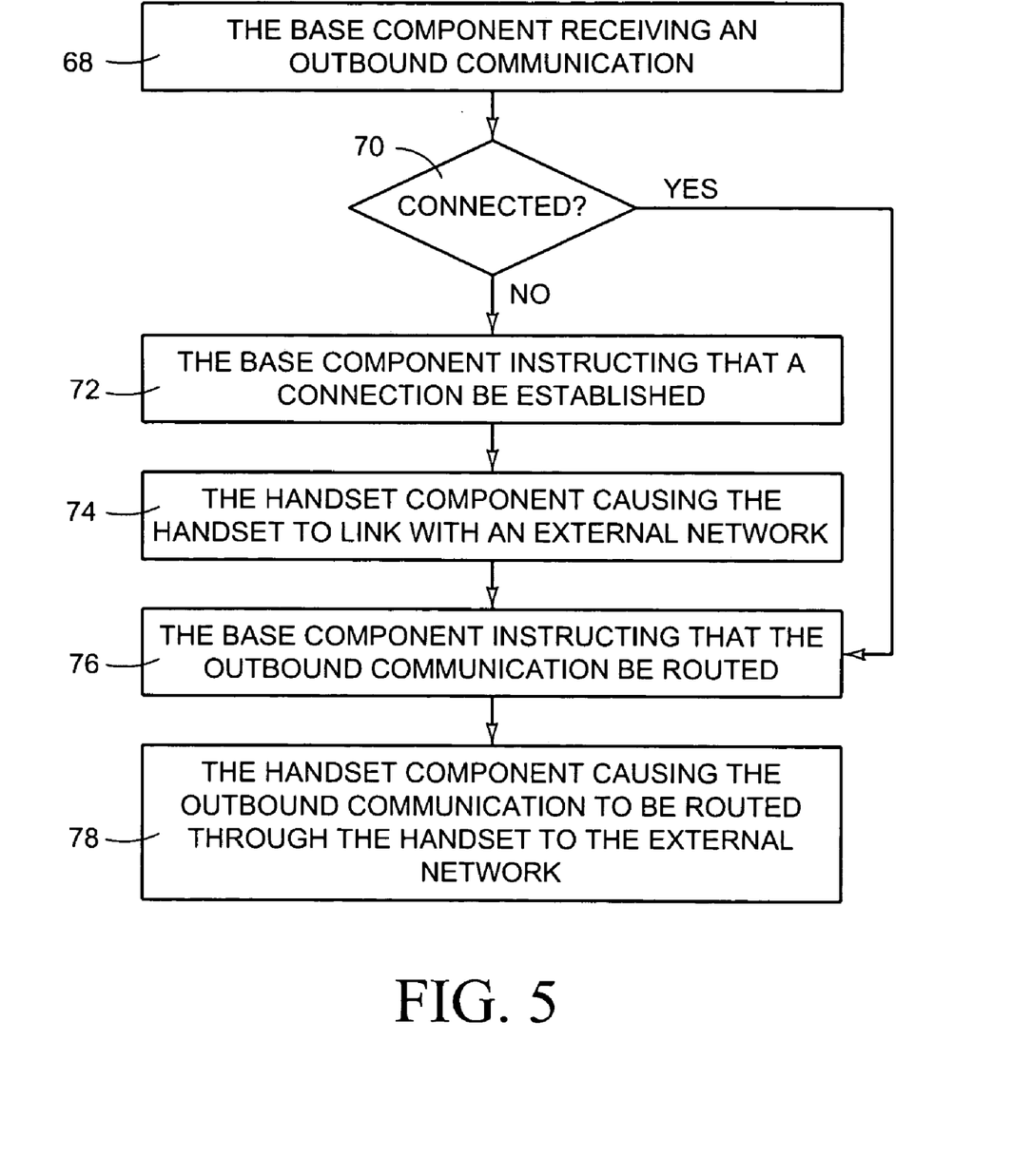

FIG. 5 is an exemplary flow diagram that helps illustrate the interaction between a base component and a handset component of a handset cradle to route an outbound network communication. Initially, the base component receives an outbound network communication (step 68). It is determined if a handset interfacing with the handset component has established a connection to an external network (step 70). If a connection has already been established the process skips ahead to step 76. Otherwise, the base component instructs that a connection be established (step 72). The handset component then causes the handset to establish a connection with an external network (step 74). The base component instructs that the outbound network communication be routed (step 76). The handset component causes the outbound network communication to be routed through the handset to the external network (step 78).

Figure 6:
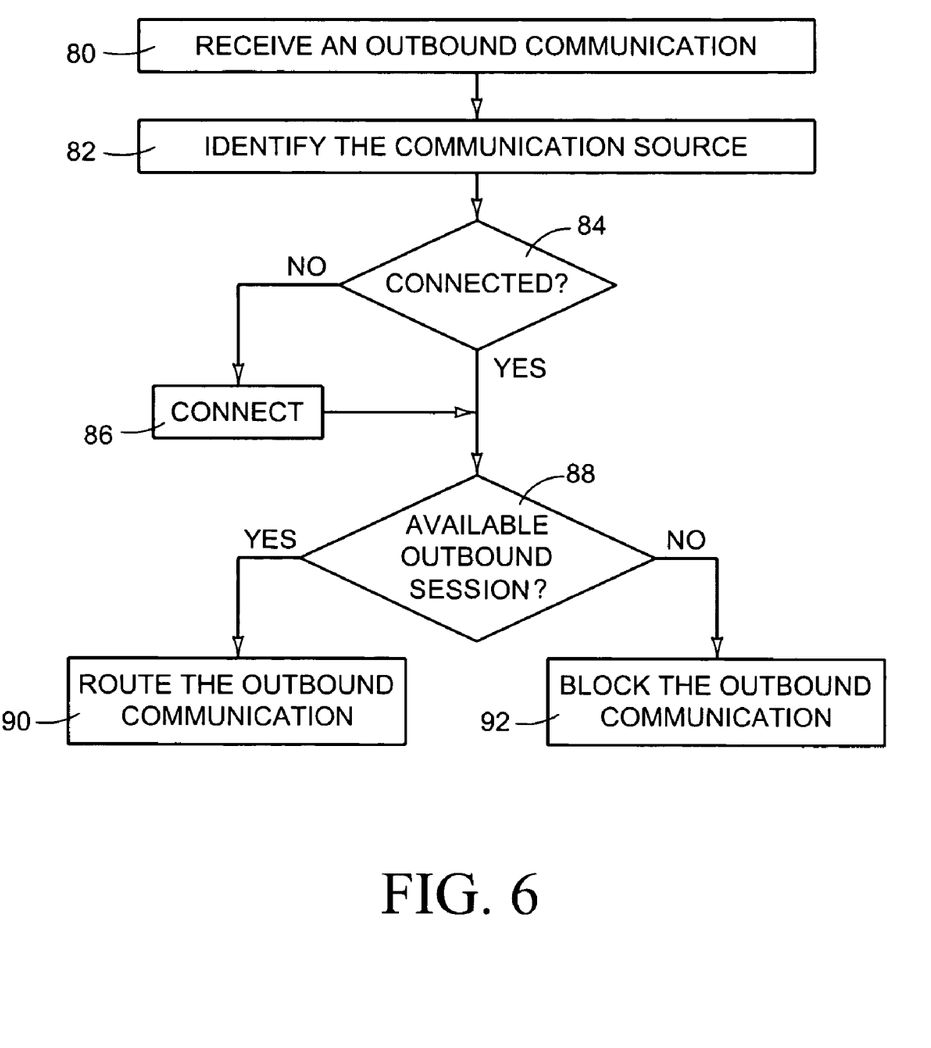

FIG. 6 is an exemplary flow diagram that helps illustrate the interaction between a base component and a handset component of a handset cradle to limit the routing of an outbound network communication. Initially, the base component receives an outbound network communication (step 80). The source of the outbound network communication is identified (step 82). Where for example, the source of the outbound network communication is a particular network device, identifying the device may include identifying an address such as an IP or MAC address for that device.

It is determined if a handset interfacing with the handset component has established a connection to an external network (step 84). If a connection has already been established the process skips ahead to step 88. Otherwise, the base component instructs that a connection be established and the handset component then causes the handset to establish a connection with an external network (step 86). It is then determined if there is an available network device session (step 88). Step 88 can, for example, involve determining if routing the outbound communication will cause the number of concurrent outbound network device session to exceed a maximum number allowed.

Where an outbound network device session has not already been established for the network device identified in step 82, routing the outbound communication will require a new session to be established. Where an outbound network device session has already been established for the network device identified in step 82, routing the outbound communication will not require a new session to be established. Establishing an outbound network device session may involve setting a flag or other indicator noting that an outbound communication received from a particular network device has been routed. That flag or indicator can be reset when once a connection to the external network is dropped.

Where in step 88 it is determined that there is an available outbound network device session, the outbound communication is routed (step 90). Where in step 88 it is determined that there is not an available outbound network device session, the outbound communication is blocked (step 92).

CONCLUSION

The schematic diagram of FIG. 1 illustrates an exemplary environment in which embodiments of the present invention may be implemented. Implementation, however, is not limited to this environment. The diagrams of FIGS. 2 and 3 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 4-6 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A system for routing network communications selectively using a session limiter and a bandwidth limiter, comprising a base component and a handset component, wherein:
   the base component including a local network interface, a router, and limiter comprising at least one of the session limiter and the bandwidth limiter;
   the handset component being connected to the base component and so as to enable an exchange of data between the base component and a handset interfacing with the handset component, wherein the handset is configured to provide the base component with a wireless data connection to an external network;
   the local network interface being configured to supply an interface for inbound and outbound network communications between the router and a plurality of network devices; and
   the router being configured to route each particular outbound network communication received from one of the plurality of network devices to be transmitted by the handset to an external network as targeted by that particular outbound network communication and to route each particular inbound network communication received by the handset from an external network to a specified one of the plurality of network devices as targeted by that particular inbound network communication;
   wherein, if the limiter comprises the session limiter, the session limiter is operable to prevent the router from routing an outbound communication that would cause a number of concurrent outbound network device sessions to exceed an identified maximum number of concurrent sessions allowed; and
   wherein, if the limiter comprises the bandwidth limiter, the bandwidth limiter is operable to select bandwidth available to the router to route one or both of the inbound and outbound network communications according to policy.

2. The system of claim 1, wherein the handset component includes a handset interface configured to physically interface with the particular type of handset.

3. The system of claim 1, wherein the handset component includes:
   a handset interface configured to physically interface with the particular type of handset; and
   a handset driver operable to translate electronic data between a first format for the base component and a second format for the particular handset type.

4. The system of claim 1, wherein the handset component is a first handset component and the particular handset type is a first particular handset type and wherein the base component is configured to be selectively coupled with the first handset component and with a second handset component configured to provide an interface with a second type of handset of selected from the plurality of handset types.

5. The system of claim 1, wherein the base component includes a handset module operable to:
   receive an input signal indicative of an action to be performed with respect to a handset interfacing with the handset component; and
   send an output signal to the handset component instructing the performance of the action.

6. The system of claim 5, wherein the handset component includes a handset driver operable to receive the output signal instructing the performance of the action and to initiate the action with respect to the handset interfacing with the handset component.

7. The system of claim 1, wherein the limiter includes the session limiter and the session limiter is operable to identify the maximum number of concurrent sessions allowed.

8. The system of claim 1, wherein the limiter comprises the bandwidth limiter and the bandwidth limiter is operable to select the selectively limit bandwidth available to the router for routing network communications according to policy based on observed behaviors.

9. The system of claim 8, wherein the bandwidth limiter is operable to select the bandwidth available for routing network communications according to policy based on observed behaviors by identifying that network communications routed by the router transfer, on average, a specified number files of a particular type over a set duration and blocking the transfer by the router of files of the particular type upon a determination that, during a subsequent duration equal to the set duration, a number of files transferred of the particular type has exceeded the specified number by a threshold amount.

10. The system of claim 8, wherein the bandwidth limiter is operable to selectively limit bandwidth available for routing network communications according to policy based on observed behaviors by identifying that network communications routed by the router transfer, on average, blocks of a given size and reducing the bandwidth available to the router to route network communications upon a determination that, during a given duration, transferred block sizes exceed the average by a threshold level.

11. The system of claim 1, wherein the base component includes a connector operable to send a signal for a handset interfacing with the handset component to connect with an external network to which the handset can transmit outbound communications.

12. The system of claim 1, wherein the limiter includes the session limiter and wherein the handset component is operable to receive information identifying the maximum number of concurrent sessions allowed from the handset interfacing with the handset component and to pass that information on to the session limiter, and wherein the session limiter is operable to prevent the routing of an outbound communication that would cause a number of concurrent outbound network device sessions to exceed the maximum number identified by the information.

13. The system of claim 1, wherein the limiter includes the bandwidth limiter and wherein the policy specifies bandwidth availability for outbound and inbound network communications transferring files of a specific type or size and wherein the bandwidth limiter is operable to reduce the bandwidth available to the router for routing communications that transfer files of the specified type or size according to the specified bandwidth availability.

14. The system of claim 1, wherein the limiter includes the bandwidth limiter and wherein the policy specifies a first duration for which network communications routed by the router can consume a first bandwidth and a second duration for which network communications routed by the router can consume a second bandwidth that is less than the first bandwidth, and wherein the bandwidth limiter is operable to reduce the bandwidth available to the router down to the second bandwidth upon a determination that the routed network communications have consumed the first bandwidth for a duration in excess of the first duration, the bandwidth limiter being operable to subsequently reduce the bandwidth available to the router down to a third bandwidth upon a determination that the routed network communications have consumed the second bandwidth for a duration in excess of the second duration, the third bandwidth being less than the second bandwidth.

15. A system for routing network communications selectively using a session limiter and a bandwidth limiter, comprising:
 a handset component that includes:
  a handset interface configured to provide an interface with a particular type of handset selected from a plurality of handset types; and
  a handset driver operable to communicate with the particular type of handset; and
 a base component coupled to the handset component, the base component including a local network interface, a router, and a limiter comprising at least one of the session limiter and the bandwidth limiter;
 the local network interface being operable to supply an interface for inbound and outbound network communications between the router and a plurality of network devices;
 the router being operable to route each particular outbound network communication received from one of the plurality of network devices to be transmitted by a handset interfacing with the handset component to an external network as targeted by that particular outbound network communication and to route each particular inbound network communication received by the handset interfacing with the handset component from an external network to a specified one of the plurality of network devices as targeted by that particular inbound network communication;
 wherein, if the limiter comprises the session limiter, the session limiter is operable to prevent the router from routing an outbound communication that would cause a number of concurrent outbound network device sessions to exceed an identified maximum number of concurrent sessions allowed; and
 wherein, if the limiter comprises the bandwidth limiter, the bandwidth limiter is operable to select a bandwidth available to the router to route one or both of the inbound and outbound network communications according to a policy.

16. The system of claim 15, wherein the base component includes a connector operable to send, via the handset component, a signal instructing the handset interfacing with the handset component to connect with an external network to which the handset can transmit outbound network communications.

17. The system of claim 15, wherein limiter includes the session limiter and the session limiter is operable to identify the maximum number of concurrent sessions allowed.

18. The system of claim 15, wherein the limiter includes the bandwidth limiter and the bandwidth limiter is operable to select bandwidth available to route one or both of the inbound and outbound network communications according to policy.

19. The system of claim 15, wherein the handset driver is operable to translate signals between a first format compatible with the base component and a second format compatible with the particular handset type.

20. The system of claim 15, wherein the handset component is a first handset component and wherein the base component is configured to be selectively coupled with the first handset component or with a second handset component configured to provide an interface with a second type of handset of selected from the plurality of handset types.

21. The system of claim 15, wherein the limiter includes the session limiter and the session limiter is operable to obtain, from the external network, the data identifying the maximum number of concurrent sessions allowed.

22. A system for routing network communications selectively using a session limiter and a bandwidth limiter, comprising:
- a base component including a local network interface, a router, and limiter comprising at least one of the session limiter and the bandwidth limiter; and
- a handset configured to exchange data with the base component, the handset being configured to provide the base component with a wireless data connection to an external network;
- the local network interface being configured to supply an interface for inbound and outbound network communications between the router and a plurality of network devices; and
- the router being configured to route each particular outbound network communication received from one of the plurality of network devices to be transmitted by the handset to an external network as targeted by that particular outbound network communication and to route each particular inbound network communication received by the handset from an external network to a specified one of the plurality of network devices as targeted by that particular inbound network communication;
- wherein, if the limiter comprises the session limiter, the session limiter is operable to prevent the router from routing an outbound communication that would cause a number of concurrent outbound network device sessions to exceed an identified maximum number of concurrent sessions allowed; and
- wherein, if the limiter comprises the bandwidth limiter, the bandwidth limiter is operable to select bandwidth available to the router to route one or both of the inbound and outbound network communications according to policy.

* * * * *